United States Patent [19]

Young et al.

[11] 4,135,817
[45] Jan. 23, 1979

[54] APPARATUS FOR MEASURING AN AIRCRAFT'S SPEED AND HEIGHT

[75] Inventors: William R. Young, Newport News; Charles W. Stump, Hampton, both of Va.

[73] Assignee: The United States of America as represented by the Administrator of the National Aeronautics and Space Administration, Washington, D.C.

[21] Appl. No.: 885,065

[22] Filed: Mar. 9, 1978

[51] Int. Cl.² .......................... G01P 3/36; H04N 7/18
[52] U.S. Cl. .................................. 356/28; 358/107
[58] Field of Search ............... 356/1, 4, 28; 358/105, 358/107, 109; 324/175 R

[56] References Cited

U.S. PATENT DOCUMENTS

| | | | |
|---|---|---|---|
| 2,944,154 | 7/1960 | Bosch | 356/28 |
| 3,057,071 | 10/1962 | Sinn | 356/28 |
| 3,514,620 | 5/1970 | Wiggerman | 356/28 |
| 3,525,568 | 8/1970 | Dreyfus | 356/28 |

OTHER PUBLICATIONS

J. O. Limb et al., IEEE Transactions on Communications, vol. Com-23, No. 4, pp. 474–478, Apr. 1975.

Primary Examiner—S. C. Buczinski
Attorney, Agent, or Firm—William H. King; John R. Manning; Howard J. Osborn

[57] ABSTRACT

Apparatus for measuring an aircraft's horizontal speed and height above ground without the need for airborne cooperative devices. Two ground level TV cameras separated by a measured distance and pointed at zenith are placed in line with the projection of the expected path of the aircraft. Speed is determined by measuring the time that it takes the aircraft to travel between the fields of view of the two TV cameras using zenith crossings as the reference points. Height is determined by correlating the speed with the time required to cross the field of view of either of the two cameras.

9 Claims, 3 Drawing Figures

APPARATUS FOR MEASURING AN AIRCRAFT'S SPEED AND HEIGHT

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The invention relates generally to measuring apparatus and more specifically concerns apparatus located at ground level for measuring the speed and height of an aircraft.

Noise pollution from aircraft is becoming more and more of a problem. In order to come up with solutions to this problem it is necessary to make many measurements of the noise generated by the aircraft that are in present use. Typically, to make measurements of the noise generated by an aircraft, an array of microphones is placed along and on both sides of the aircraft's expected path of travel as projected on the ground. Then the distance from the noise source (aircraft) to the ground-based microphones must be determined so that the sound pressure measurements can be corrected for propagation losses. To determine the distance from the noise source to the microphones, it is necessary to know the aircraft's speed and height above the ground as it travels along its expected path. Once the aircraft's height and speed at some known point relative to this array is determined, the distance from each microphone to the aircraft can be calculated for each data point. It is, therefore, the primary purpose of this invention to provide apparatus that is simple and inexpensive for measuring the speed and height of an aircraft as it travels along its expected path.

Prior apparatus for measuring aircraft height and ground speed used an aircraft radar altimeter on the ground in an upside down configuration. The disadvantages of the radar altimeter apparatus are the acquisition times are excessive and the zenith crossing times cannot be measured with sufficient accuracy, resulting in corresponding errors in determining aircraft speed. It is, therefore, an object of this invention to provide apparatus for measuring the height and speed of an aircraft that decreases the disadvantages that have been encountered with previous apparatus.

SUMMARY OF THE INVENTION

Two ground located TV cameras separated by a measured distance and pointed at zenith are placed in line with the projection of expected path of travel of the aircraft. Speed is determined by measuring the time it takes the aircraft to travel from the field of view of one of the TV cameras to the field of view of the other TV camera using zenith crossings as the reference points. The time that it takes the aircraft to travel through the field of view of either of the cameras is measured. This time is used to calculate the height of the aircraft.

DETAILED DESCRIPTION OF THE INVENTION

Figure 1:
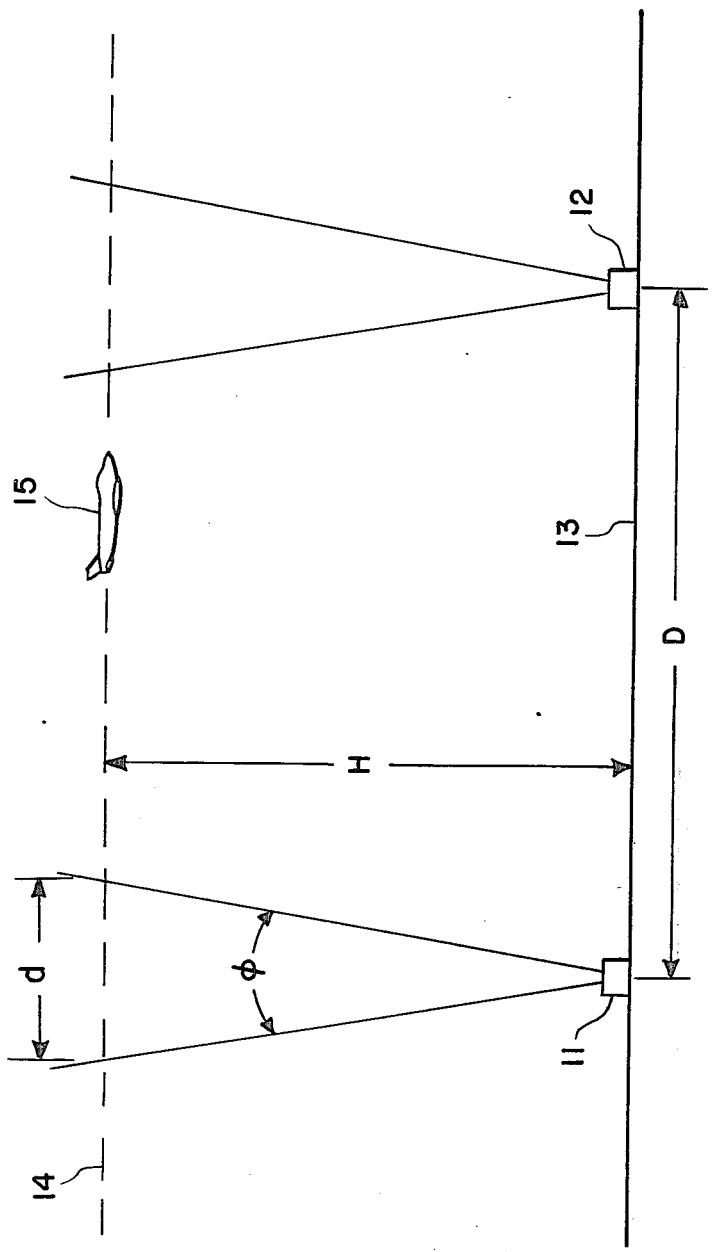
FIG. 1 is a schematic drawing of the physical layout of the apparatus used in this invention.

FIG. 1 illustrates the geometry used by the present invention. TV cameras 11 and 12 are placed at ground level on the projection 13 of the expected path 14 if an aircraft 15. Each of these TV cameras are positioned such that its horizontal scan lines are perpendicular to path 14 and its horizontal scan line 122 is pointed at the zenith. The resulting parameters are shown in FIG. 1 and defined and listed below:

S = average aircraft ground speed between cameras
H = average aircraft height above TV cameras
$\phi$ = television camera lens angular field of view
d = distance across field of view at height H
D = distance between TV cameras
$t_1$ = time required for the aircraft to travel distance d
$t_2$ = time required for the aircraft to travel distance D S is determined from $t_2$ using the relationship $$S = D/t_2 \qquad (1)$$

From the geometry of FIG. 1, we can write $$d/H = 2 \tan(\phi/2) \qquad (2)$$

$$d = t_1 S \qquad (3)$$

Hence, $$t_1 S/H = 2 \tan(\phi/2) \qquad (4)$$

$$H = \frac{t_1 S}{2 \tan(\frac{\phi}{2})} \qquad (5)$$

Equations (1) and (5) above give the aircraft height and ground speed in terms which can be measured from the ground. Time measurements $t_1$ and $t_2$ are determined from the two TV camera video signals by timing electronics.

Figure 2:
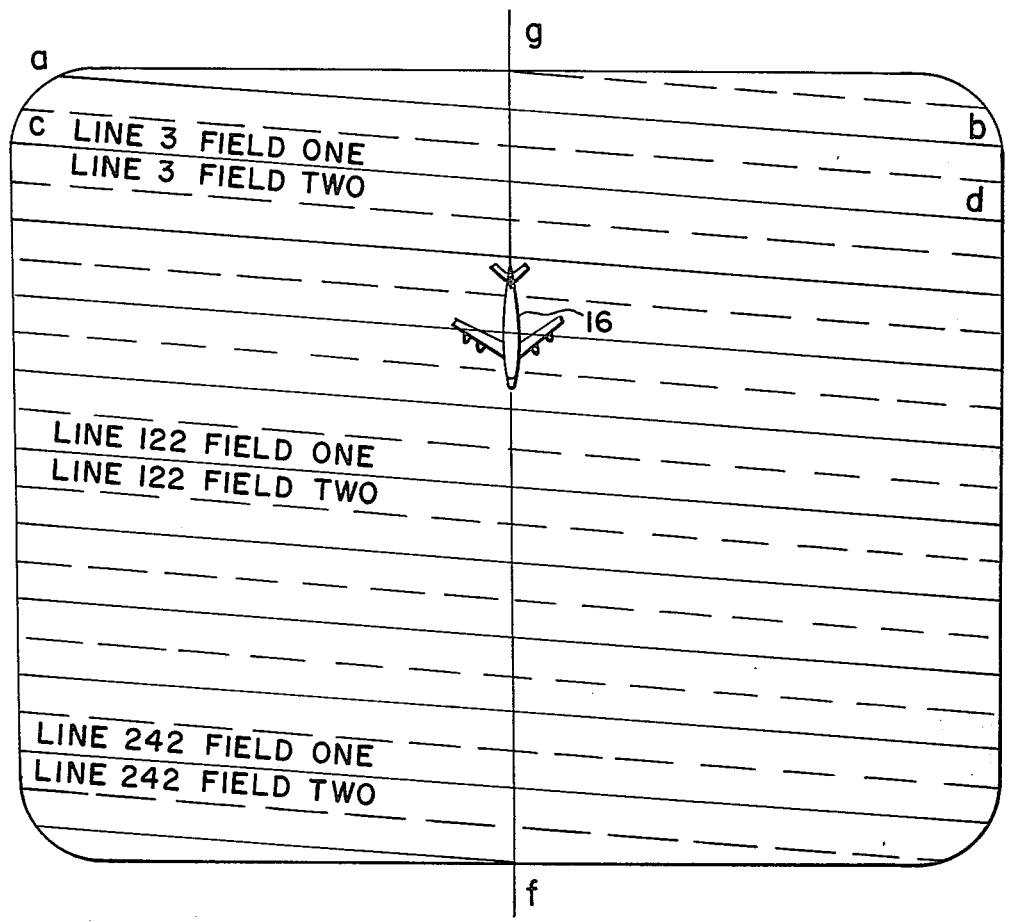
FIG. 2 is a schematic drawing for the purpose of describing the TV techniques used by this invention.

A brief review of TV scanning principles is necessary to understand the timing and detection technique used as well as the accuracy and resolution limitations. In a standard TV system, there are 525 scan lines per frame with two interlaced fields per frame, each field having 262.5 lines. The TV picture is scanned from left to right at a uniform rate along lines that are evenly spaced as shown by the solid lines in FIG. 2. When the end of a line (such as line 'ab') is reached, the scanning spot returns or retraces to the left (such as from point b to point c) and a new line is started (such as 'cd'). Simultaneously with the left to right movement, the spot moves downward at a constant rate causing each line to start at a point slightly below the end of the previous line. When the bottom of the picture is reached, the scanning spot returns to the top of the picture during a time interval called vertical retrace. The picture is scanned again in a similar fashion with the scan lines of this second field interlaced between those of the previous field. This interlaced field is shown in FIG. 2 by the dotted lines. These two successive interlaced fields comprise a frame. There are 30 frames or 60 fields per second. Obviously all of the scan lines are not shown in FIG. 2 and their skewness is greatly exaggerated for clarity.

Note that the bottom line in FIG. 2 is numbered 242 instead of 262 (262 is approximately one-half of 525). The time taken by approximately 20 scan lines in each field is required to return the scanning spot to the top of the picture (vertical retrace). This time interval is also used for the vertical synchronization pulse. This leaves only 242.5 lines per field or 485 lines per frame for use in the picture. Similarly, the horizontal synchronization pulses occur during horizontal retrace.

The video signals from selected scan lines are continuously monitored for aircraft crossings. Distinguishing between clouds, birds, and aircraft as they appear on these video signals is perhaps the biggest problem in the application of this method. Differentiating the video signal is the approach used. This takes advantage of the fact that many clouds have a "soft" or gradual edge causing a more gradual change in image intensity and video signal amplitude as the line is scanned from clear sky to cloud or vice versa. Aircraft (and birds, too, unfortunately) have a "hard" or abrupt edge which causes a step funtion to appear in the video signal. By carefully adjusting the differentiation time constant, slower cloud-type changes in the video signal are suppressed while sudden changes appear as spikes on the differentiator output and are detected as an aircraft on the scan line.

Birds are distinguished from aircraft by using the fact that they are not as likely to fly over both cameras as are the intended aircraft. There will be infrequent occasions when either a bird or a cloud will give false triggers. Fortunately, both situations are temporary.

When both cameras are positioned to measure $t_1$ and $t_2$, their scan lines are perpendicular to the aircraft flight path as shown in FIG. 2, and scan line 122 of both cameras is pointed at zenith (scan line 122 is approximately the center scan line). The timing electronics shown in FIG. 3 determine $t_1$ and $t_2$ by measuring the time intervals between the aircraft's image 16 crossing selected scan lines. The third scan line from the top and bottom of each field (lines 3 and 241) is used for determining field of view passage time $t_1$. The center scan line, number 122, is used to mark the aircraft's zenith passage for both cameras. From these zenith passage times, $t_2$ is determined.

Figure 3:
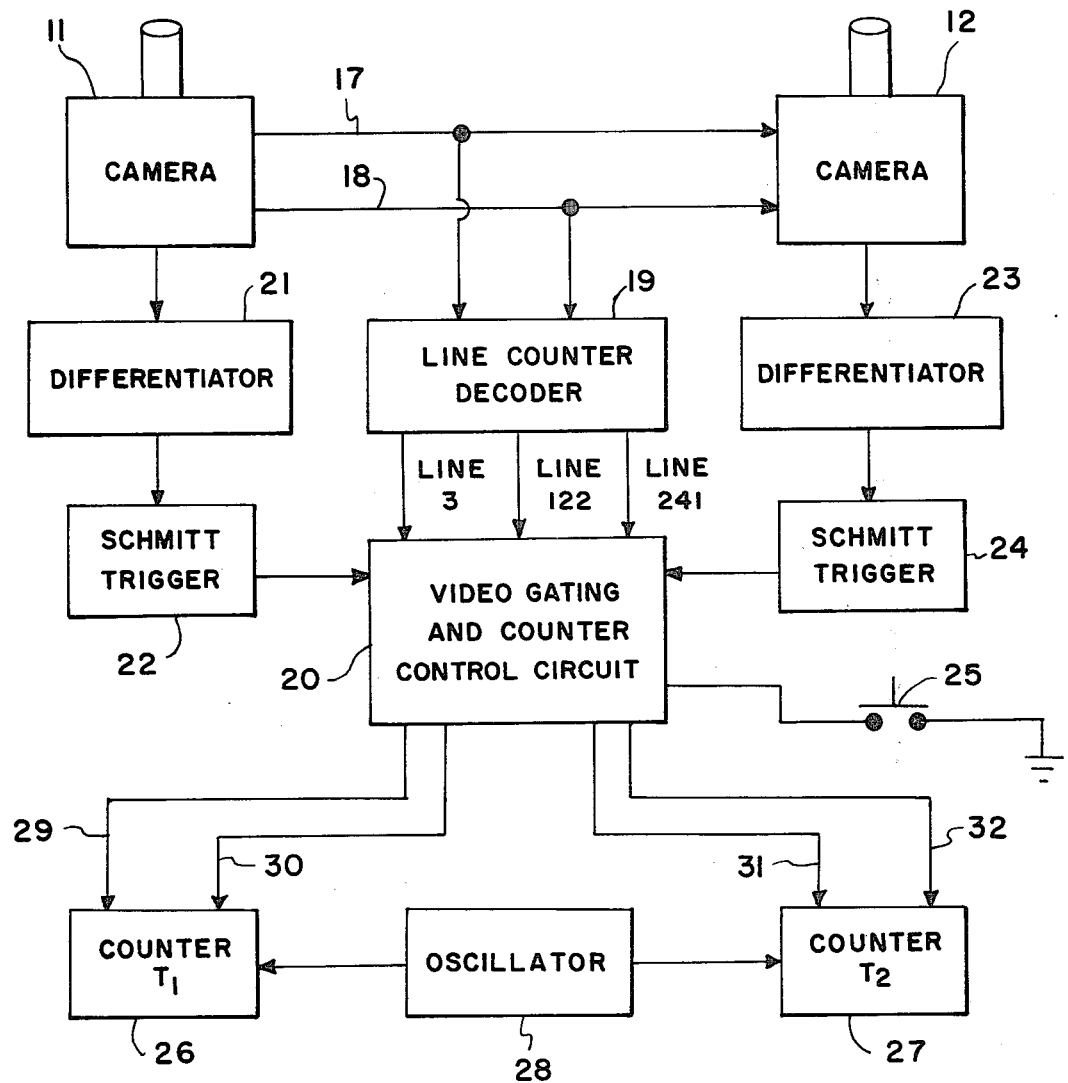
FIG. 3 is a block diagram of the embodiment of the invention selected for illustration in the drawings.

Turning now to the embodiment of the invention selected for illustration in the drawings, the camera 12 in FIG. 3 is synchronized with camera 11 by applying the horizontal sync from camera 11 through a connector 17 to camera 12 and by applying the vertical sync from camera 11 through a connector 18 to camera 12. The horizontal sync and the vertical sync are applied to a line counter decoder 19. The vertical sync signals are used to reset the line counter decoder 19 and the horizontal sync signals are counted by the line counter. Signals are produced on the three outputs of the line counter decoder 19 whenever 3, 122, or 241 horizontal sync signals are counted. The three outputs from line counter decoder 19 are applied to a video gating and counter control circuit 20. Line counter decoder 19 is an eight stage counter having outputs A, B, C, D, E, F, G, and H (H is the most significant digit) followed by logic circuitry which will produce an output whenever counts 3, 122 or 241 are in the counter. Any logic circuitry that will produce the Boolean expressions $A\,B\,\overline{C}\,\overline{D}\,\overline{E}\,\overline{F}\,\overline{G}\,\overline{H}$ (3), $\overline{A}\,B\,\overline{C}\,D\,E\,F\,G\,\overline{H}$ (122), and $A\,\overline{B}\,\overline{C}\,D\,E\,F\,G\,H$ (241) will be adequate for the decoder.

The video output from camera 11 is applied through a differentiator 21 and a Schmidt trigger 22 to the video gating and counter control circuit 20. The video output of camera 12 is applied through a differentiator 23 and a Schmidt trigger 24 to the video gating and counting control circuit 20. A switch 25 provides a reset for the video gating and counter control circuit 20. A counter 26 and a counter 27 are both supplied signals to be counted from an oscillator 28.

Whenever a trigger appears at the output of Schmidt trigger 22 at the same time that there is a gate pulse signal corresponding to the duration of line 3 appears on the line 3 output of decoder 19 video gating and counter control circuit 20 produces a start signal that is applied through connector 29 to counter 26 to start the counter. Whenever a trigger appears at the output of Schmidt trigger 22 at the same time a gate pulse signal corresponding to the duration of line 241 appears on the line 241 output of decoder 19 video gating and counter control circuit 20 produces a stop signal that is applied through a connector 30 to counter 26 to stop the counter. Whenever a trigger appears at the output of Schmidt trigger 22 at the same time a gate pulse signal corresponding to the duration of line 122 appears at the line 122 output of decoder 19 video gating and counter control circuit 20 produces a start signal that is applied through a connector 31 to counter 27 to start the counter. Whenever a trigger appears at the output of Schmidt trigger 24 at the same time a gate pulse signal corresponding to the duration of line 122 appears at the line 122 output of decoder 19 video gating and counter control 20 produces a stop signal that is applied through a connector 32 to counter 27 to stop the counter. The circuitry for video gating and counter control circuitry 20 can be any conventional logic circuitry that will perform the four "and" operations described above.

The operation of the circuitry disclosed in FIG. 3 can best be understood by referring to FIG. 1. Assume that an aircraft 15 is flying along a path 14 from left to right as shown. When it first comes into the field of view of camera 11 there appears a signal on the video output of camera 11 which is differentiated by differentiator 21. The resulting signal is applied to Schmidt trigger 22 which applies a signal to the video gating and counting control circuit 20. When the line counter decoder 19 produces a signal on line 3 corresponding to the scanning of line 3 the simultaneous occurrence of a signal from Schmidt trigger 22 and a signal from line counter decoder 19 line 3 causes the video gating and counter control circuit 20 to produce a start signal that is applied through connector 29 to counter 26 to start the measurement of $t_1$. As the aircraft nears the end of the field of view of camera 11 the simultaneous occurrence of a signal from Schmidt trigger 22 and a signal corresponding to the scanning of line 241 from line counter decoder 19 line 241 causes the video gating and counter control circuit 20 to produce a stop pulse that is applied through connector 30 to counter 26. Consequently, the count recorded on counter 26 is proportional to the time it took the aircraft to fly through the field of view of camera 11.

Similarly, as the aircraft flies through the field of view of camera 11 line counter decoder 19 produces a signal on line 122 causing video gating and counter control circuit 20 to produce a start signal that is applied through connector 31 to counter 27 to start the measurement of $t_2$. Thereafter when the aircraft flies through the field of view of camera 12 a video output is produced by camera 12 that is applied through the differentiator 23 to the Schmidt trigger 24 causing it to apply a signal to video gating and counter control circuit 20. While the aircraft is flying through the field of view of camera 12 a signal is produced on line 122 which causes the video gating and counter control circuit 20 to produce a stop signal that is applied through connector 32 to counter 27. Consequently, the count on counter 27 is proportional to the time that it takes the aircraft to fly from the center of the field of view of camera 11 to the center of the field of view of camera 12. The values for $t_1$ and $t_2$ which are the counts on counters 26 and 27, respectively, can then be used to calculate the speed and height of the aircraft by means of the equations set forth above.

The advantages of this invention are that it can determine the height and speed of an aircraft as a function of time as it travels a path in line with a runway without using cooperative devices such as reflectors, beacons, or transponders. Its advantages over the radar altimeter are that its acquisition time is better than 8 times faster, its aircraft zenith crossing time can be measured with an order of magnitude improvement, and its television system can respond to smaller targets.

What is claimed is:

1. Apparatus for producing values that can be used to calculate the speed and height of an aircraft comprising:
a first TV camera with its field of view covering a first part of the anticipated path of said aircraft;
a second TV camera with its field of view covering a second part of the anticipated path of said aircraft;
the second TV camera being at the same elevation as the first TV camera, a known distance therefrom, and forming a line with the first TV camera that is a projection of said anticipated path;
means connected to said first TV camera for measuring the time $t_1$ it takes an aircraft to travel through the field of view of the camera; and
means connected to said first and second TV cameras for measuring the time $t_2$ it takes an aircraft to travel between the fields of view of said first and second TV cameras whereby whenever an aircraft travels along said anticipated path the values $t_1$ and $t_2$ are produced which can be used to calculate the speed and height of said aircraft.

2. Apparatus according to claim 1 wherein said means for measuring the time $t_1$ includes a counter and means for starting the counter when an aircraft enters the field of view of the first TV camera and means for stopping the counter when the aircraft leaves the field of view of the camera.

3. Apparatus according to claim 2 wherein said first TV camera is positioned such that its horizontal scan lines are perpendicular to said anticipated path, means for applying a start signal to said counter when an aircraft crosses a first selected horizontal scan line near the beginning of the field of view of said camera and means for applying a stop signal to said counter when the aircraft crosses a second selected horizontal scan line near the end of the field of view.

4. Apparatus according to claim 3 wherein said means for generating the start and stop signals includes means for receiving the video output from said first TV camera for generating a signal each time a horizontal scan line crosses an aircraft and means for selecting the signal generated by said second selected horizontal scan line as said stop signal.

5. Apparatus according to claim 4 wherein said means for generating a signal each time a horizontal scan line crosses an aircraft includes a differentiator.

6. Apparatus according to claim 1 wherein said means for measuring the time $t_2$ includes a counter and means for starting the counter when an aircraft passes a selected line in the field of view of the first TV camera and for stopping the counter when the aircraft passes the line in the field of view of the second TV camera corresponding to said selected line.

7. Apparatus according to claim 6 wherein said first and second TV cameras are positioned such that their horizontal scan lines are perpendicular to said anticipated path, and said selected line and said corresponding line are corresponding horizontal scan lines in said first and second TV cameras.

8. Apparatus according to claim 7 wherein said means for starting the counter and means for stopping the counter includes means receiving the video output from said first TV camera for generating a signal each time a horizontal scan line crosses an aircraft, means for selecting the signal generated by said selected horizontal line and applying it to said counter for starting it, means receiving the video output from said second TV camera for generating a signal each time a horizontal scan line crosses an aircraft, and means for selecting the signal generated by said corresponding horizontal scan line and applying it to said counter for stopping the counter.

9. Apparatus according to claim 8 wherein each of said means for generating a signal each time a horizontal scan line crosses an aircraft includes a differentiator.

* * * * *